July 6, 1965　　　KEIZO YAMAJI　　　3,192,829
VARIFOCAL LENS SYSTEM OF WIDE VARIFOCAL RANGE
Filed June 16, 1961　　　　　　　　　　3 Sheets-Sheet 1

INVENTOR.
KEIZO YAMAJI
BY
ATTORNEY

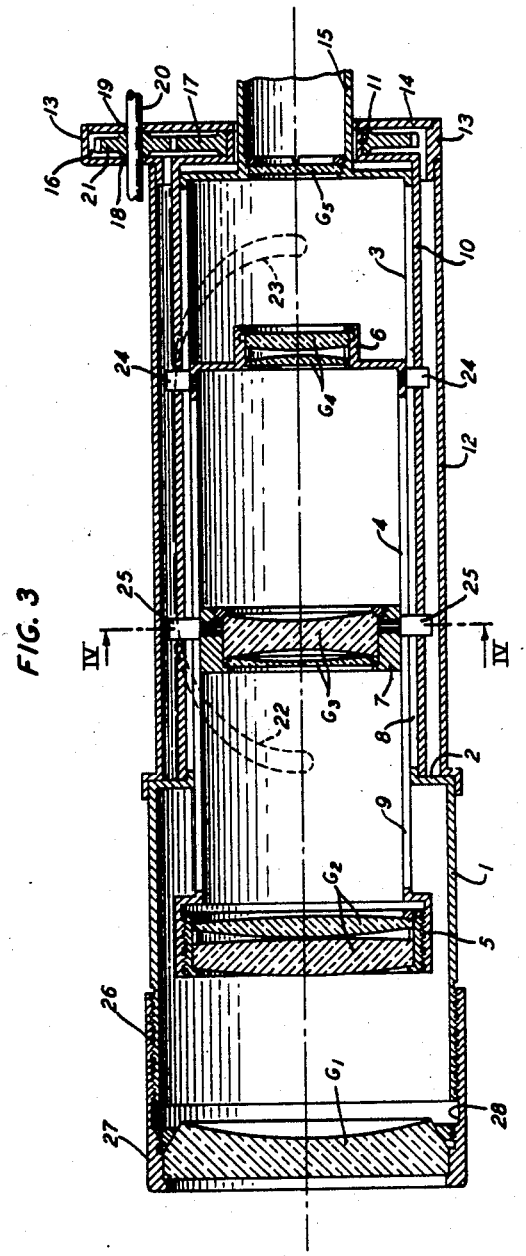

July 6, 1965 KEIZO YAMAJI 3,192,829
VARIFOCAL LENS SYSTEM OF WIDE VARIFOCAL RANGE
Filed June 16, 1961 3 Sheets-Sheet 3

INVENTOR
KEIZO YAMAJI
BY
ATTORNEY

United States Patent Office 3,192,829
Patented July 6, 1965

3,192,829
VARIFOCAL LENS SYSTEM OF WIDE
VARIFOCAL RANGE
Keizo Yamaji, 310 4-chome, Denenchofu, Otaku,
Tokyo, Japan
Filed June 16, 1961, Ser. No. 120,131
3 Claims. (Cl. 88—57)

This invention relates to varifocal lens systems for photographic and/or projection purposes.

This application is a continuation-in-part of application Serial Number 708,803, filed January 14, 1958, and now abandoned.

Several optical systems wherein the total focal length or magnification of the whole system is continuously variable by moving a lens, or a plurality of the lenses thereof, along the common optical axis of the lens system along which all of its lenses are aligned, are prior known.

Generally, in such prior known varifocal systems, a part of the movable lens components is moved to vary the focal length or magnification of the whole system, and, at the same time, other movable lenses are moved in relation to the former in order to obtain the spatially fixed image point. The roles of the two sets of movable lenses are thus usually definitely distinguishable. In such prior known systems, the amount of movement of the movable lenses must inevitably be very large to obtain a wide range of variable magnification; hence the total length of the entire system will be large, and, unless the diameter of the front lens is made large, it will be difficult to secure adequate light flux over the peripheral portion of the image area. Furthermore, the large magnitude of movement of the movable lenses will increase the changes in the aberrations and render it difficult to correct the aberrations over the whole range of variable magnification.

The object of the present invention is to provide a variable lens system free of all the above mentioned defects while, nevertheless, having a very wide range of variable focus magnification although the movement of each movable lens, and thus of the whole lens system, is of rather small magnitude and correction of the aberrations is relatively easy.

A preferred embodiment of my invention consists of five components, of which the first and the fifth components are both fixed in position when varying the focal length of the whole system, while the first component is movable in focusing on an object. Three movable components, namely the second, third and fourth components, are positioned between the fixed first and fifth components. All five components are arranged on a common optical axis, and each component is of a refractive power of the opposite sign as compared to the immediately preceding component. The first component may be either positive or negative (convergent or divergent), and each successive component is given an alternative refractive power. When the first component, for instance, is positive, the third and fifth components are also positive, and the second and fourth components negative; and vice versa.

The feature of the varifocal system according to my invention is that the three movable components may partake of such movement that the image of an object at a fixed distance from the system may be held substantially constant at a given point while the focal length or magnification of the whole system is continuously varied, and, furthermore, that the second and fourth components move axially in the same direction while the third component moves axially in the opposite direction, whereby the individual magnifications of the three componets simultaneously and uniformly increase or decrease, and each of the three movable components functions simultaneously at a magnification substantially equal to minus unity at a certain position of its movement. The order of the components is counted from the front to the rear, that is, from the side nearer the long conjugate to the side nearer the shorter conjugate.

A clear concept of the scope and purpose of this invention may be obtained from the following description, taken in connection with the appended claims and the attached drawing, in which:

FIG. 3 is a longitudinal section in the vertical plane through the axis of the lens barrel of the illustrative embodiment of my invention;

FIG. 4 is a cross-section on line IV—IV of FIG. 3;

Figure 1:
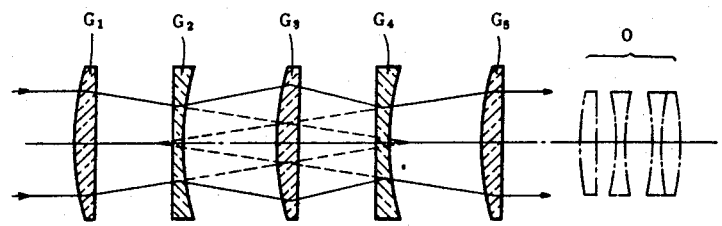
FIG. 1 is a simplified schematic of the lens components and their relative position in an embodiment of the wide range varifocal lens system according to my invention.

Referring to FIG. 1, the fixed components $G_1$ and $G_5$ are of positive power and the three movable components $G_2$, $G_3$ and $G_4$, are aligned therebetween to vary the focal length of the whole system. The negative components $G_2$ and $G_4$, move in the direction opposite to that of the positive component $G_3$.

In the varifocal movement of each movable component, there is a configuration at which each individual magnification of the movable elements becomes minus unity at the same time. When each intermediate image formed by a preceding component, or the preceding plurality of components, is assumed as the effective object for the immediately succeeding component, that is, the image formed by component $G_1$ is the effective object for component $G_2$; the image formed by the system consisting of components $G_1$ and $G_2$ serves as the effective object for component $G_3$, etc., in this particular position of the movable components, each component simultaneously produces an image of equal size which is inverted in respect of its effective object. The system shown in FIG. 1, consisting of the components $G_1$ through $G_5$, is an afocal system, with which a photographic or projection objective lens, designated 0 in FIG. 1, is simultaneously used for photographic or projection purposes. While the component $G_1$ is above described as a fixed component, usually, however, such component $G_1$ is adjustable along the optical axis, independently of the magnification, for focusing purposes.

Since component $G_5$ is not adjustable at all, it may be fixed to, or incorporated in, photographic objective 0, in which case the varifocal attachment, consisting of components $G_1$ to $G_4$, does not constitute an afocal optical system. While the sign of the refractive power of each component may be reversed, as in the embodiment shown in FIG. 5, the preferred form of my present optical system is the symmetrical type of afocal varifocal system. Being of a symmetrical type, the refractive power of the lens component $G_1$ is equal to that of the lens component $G_5$ and the refractive power of the lens component $G_2$ is equal to that of the lens component $G_4$. The focal lengths (that is, the reciprocal numbers of the refractive powers) of $G_2$ and $G_4$ are made respectively $f_2$ and $f_4$ ($=f_2$), and the focal length of movable component $G_3$, positioned therebetween, is made $f_3$. In this varifocal system, the second and fourth components are mechanically coupled so as to move in unison, and hence the movement of each of these components is in an equal amount. This is indicated in FIG. 1 by connecting lens tube 4, of which greater details are given in FIG. 3 and below in this specification.

Figure 2:
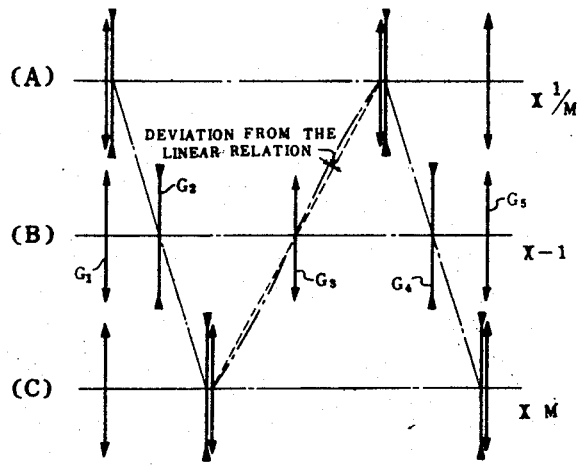
FIG. 2 is a diagram showing the location of the movable lens components relative to the fixed lens components when varying the overall focal length of the system.

In order to determine the required movement of each of the three movable components so that the image of a fixed object is unvaryingly formed at a fixed point even though the magnification is varied, consideration must be given to the mathematical equation:

$$(f_2^2 - t^2)s^2 + 2t^3 s - t^2(t^2 - 2f_2 f_3) = 0 \quad (1)$$

where $t$ is the displacement along the optical axis of component $G_2$ relative to the location of component $G_2$ when component $G_2$ functions at a magnification of minus unity. Displacement of $G_2$ to the right (FIGS. 1 and 2) from such location, shown in FIG. 1 and line (B) of FIG. 2, is expressed by plus, while displacement to the left is considered to be minus or negative, and $s$ is the displacement of component $G_3$ relative to that position of component $G_3$ at which such component produced a magnification of minus unity. Such reference position of component $G_3$ is shown in FIG. 1 and line (B) of FIG. 2. Obviously the displacement of component $G_4$ which is tied to component $G_2$, is likewise $t$, and is positive or negative in the same manner.

Now, let T and S be the values of $t$ and $s$ when components $G_2$ and $G_3$ are closest to each other as shown in line (C) of FIG. 2, while observing Equation 1: then $$T - S = 2(f_2 + f_3) \quad (2)$$

in which the thickness of each component is considered sufficiently thin. In fact, it is necessary to multiply the right side of Formula 2 by a factor $k$ representing the thickness, where $k$ is less than 1 but greater than 0. Doing so, however, will merely result in somewhat reducing the range of magnification. Therefore, only the first case requires consideration.

From Formulas 1 and 2

$$4[(f_2+f_3)^2 - f_2(f_2+2f_3)]T^2 + 4f_2^2(f_2+f_3)T - 4(f_2+f_3)^2 f_2^2 = 0 \quad (3)$$

wherein $T > 0$, is obtained. The combined magnification M of the movable components at one end of the varifocal range is represented as a product of the magnifications $m_2$, $m_3$, and $m_4$ of components $G_2$, $G_3$ and $G_4$, respectively, as follows:

$$M = m_2 \times m_3 \times m_4$$

where $$\left.\begin{array}{l} -m_2 = \dfrac{f_2}{f_2 + T} \\[4pt] -m_3 = \dfrac{f_3 + 2(f_2+f_3) - \dfrac{f_2 T}{f_2 - T}}{f_3} \\[4pt] -m_4 = \dfrac{f_2 - T}{f_2} \end{array}\right\} \quad (4)$$

and

The magnification at the other end of the varifocal range will be $1/M$ because of the very nature of the symmetrical type, and, therefore, the varifocal ratio R of the whole system will be $R = M^2$.

Similarly, the varifocal ratios of the lens components $G_2$, $G_3$ and $G_4$ will be:

$$R_2 = m_2 m_4, \quad R_3 = m_3^2, \quad \text{and} \quad R_4 = m_2 m_4 = R_2$$

respectively; and since in this specification the focal lengths $f_1$ and $f_5$ of the two fixed components, $G_1$ and $G_5$, are identical and are given by $$f_1 = T - 2f_2$$

and the total length L of the entire system is $$L = 4(f_2 + f_3) + 2T$$

In the above two formulae, the thickness of each lens component is neglected as being sufficiently thin. In fact, it is necessary to multiply the right side of these formulae by a factor K representing thickness, where K is less than 1 but greater than 0 for the same reason as for Formula 2.

In FIG. 2, line (A) thereof diagrammatically shows the arrangement of components $G_1$ through $G_5$ when the magnification of the whole system is $1/M$; line (B), when such magnification is $-1$; and line (C) when such magnification is M. The vertical lines in FIG. 2 representing elements $G_1 \ldots G_5$, have outwardly directed arrows at both ends thereof where the lens component is positive and inwardly directed arrows when the lens component is negative. The chain lines interconnecting the representation and position of each movable component in each of the three lines (A), (B) and (C) indicate the location of each movable component when the magnification of the whole system is of values intermediate the specific magnification values of the three lines. As shown in FIG. 2, the loci of the positions to which components $G_2$ and $G_4$ and $G_3$ may be moved are not straight lines but rather in the form of elongated S's, although in each case the deviation from true linearity is quite small and is zero at three positions, namely, at both ends of the movement of the components, as shown in lines (A) and (C) of FIG. 2, and at the intermediate position where the magnification of the component is minus unity, as shown in line (B) of FIG. 2. For convenience, assume any mechanism capable of moving components $G_2$, $G_3$ and $G_4$ in a linear relation and proportional to one another. Then, such slight amount of image displacement in the intermediate position is within the depth of focus of this varifocal optical system.

Numerical examples are as follows:

*Example 1*

| | |
|---|---|
| $f_1 = +70$ | $d_{12} = 0-20$ |
| $f_2 = -30$ | $d_{23} = 60-0$ |
| $f_3 = +45$ | $d_{24} = 60$ |
| $f_4 = -30$ | $d_{34} = 0-60$ |
| $f_5 = +70$ | $d_{45} = 20-0$ | where $f_1$, $f_2$, $f_3$, $f_4$ and $f_5$ represent the focal lengths of components $G_1$, $G_2$, $G_3$, $G_4$ and $G_5$; $d_{12}$, $d_{23}$, $d_{24}$, $d_{34}$, and $d_{45}$ represent the distance between each pair of components in which each component is designated by one digit of the two-digit subscript; and $$R = 9 \quad L = 80 \quad T = 10 \text{ and } S = -20$$

*Example 2*

| | |
|---|---|
| $f_1 = -72$ | $d_{12} = 0-24$ |
| $f_2 = +42$ | $d_{23} = 56-0$ |
| $f_3 = -28$ | $d_{24} = 56$ |
| $f_4 = +42$ | $d_{34} = 0-56$ |
| $f_5 = -72$ | $d_{45} = 24-0$ |

This is also an example of the afocal system, and $$R = 9 \quad L = 80 \quad T = 12 \text{ and } S = -16$$

When either of the above examples of varifocal lens systems is attached to a motion picture camera objective of 30 mm. focal length, the focal length of the combined system may be varied to any value from 90 mm. to 10 mm. since the zooming system comprising components $G_1$ to $G_5$ having a ratio of 9, can vary the magnification between three times the focal length ($3 \times 30 = 90$) and one-third times the focal length ($\frac{1}{3} \times 30 = 10$).

Referring now to FIGS. 3 and 4 showing the mechanical structure incorporating the lens system shown in FIG. 1 and the operation of FIG. 2 thereof, fixed tube 1 has an inwardly extending annular shoulder 2 from the inner periphery of which a tubular extension 3 extends rearwardly, the rearward region 15 of tubular extension 3 being of reduced diameter and supporting therewithin fixed lens component $G_5$. An inner lens tube 4 is snugly fitted within the interior of fixed tube 1 and is slidable longitudinally within fixed tube 1 and its tubular extension 3.

The forward end of inner tube 4 is provided with a tubular portion 5 of increased diameter, relative to that of inner tube 4, lens component $G_2$ being housed in the forward end region thereof, while the back end of the inner tube is provided with a tubular portion 6 of decreased diameter relative to that of the inner tube, lens component $G_4$ being housed in tubular portion 6. The other movable lens component $G_3$, is supported within an innermost, short lens tube 7 which is snugly fitted inside inner lens tube 4 and is slidable longitudinally therein. A pair of linear slots 8 extending almost the entire length of the tubular extension 3, are provided in extension 3 diametrically opposite each other and parallel to the optical axis of the system. Similarly, inner lens tube 4 is provided with a pair of linear slots 9 extending almost the entire length of inner tube 4 and aligned with slots 8 of tubular extension 3. A tube 10 is fitted snugly about the exterior of tubular extension 3 and rotatable thereabout. The rearmost region of rotatable tube 10 is in the form of a short cylinder or sleeve 11 which forms a small annular gap with the reduced rearward region 15 of extension 3. An outer fixed tube 12 covers rotatable tube 10, and a tubular cover 13 is tightly affixed to the back end of tube 12, of which the forward end is supported on the exterior of fixed tube 1 forward of annular shoulder 2. Tubular cover 13 has a radially outwardly extending portion at its upper portion region as assembled with fixed tube 12, thus providing an enlarged interior region for a purpose that will immediately appear.

An end wall or cover 14 is affixed to both the tubular cover 13 and the outer cylindrical surface of reduced end region 15 of tubular extension 3, which end cover 14 prevents longitudinal movement of rotatable tube 10. Within the longitudinal and annular region 16 formed by end cover 14 and tubular cover 13 into which sleeve 11 of rotatable tube 10 projects, a gear 17 is integrally supported on sleeve 11. Bearing bore 18 passes through the outwardly extending portion of tubular cover 13, bearing bore 18 being aligned with bearing bore 19 through the end cover 14, and a drive shaft 20 is journalled in bores 18 and 19. A pinion 21 integrally on shaft 20 meshes with gear 17.

Rotatable tube 10 is provided with two helical slots 22 and 23, as shown in FIG. 3, a quadrant in length and positioned in the same quadrant and curved in opposite sense, slot 22 being convex to the forward tube end while 23 is concave thereto. The movements of the respective tubes 4 and 7 by slots 22 and 23, are equal at all degrees of rotation of tube 10. It will be noted that the number of helical slots 22 and 23 is equal in number to the pair of linear slots 8 of tubular extension 3 and slots 9 of inner lens tube 4. A pair of diametrically opposite guide pins 24 is affixed to the back end portion of inner lens tube 4 and extends radially through the therewith associated linear slots 8 and 9 and helical slot 23. Another pair of guide pins 25, and likewise positioned diametrically opposite each other, is affixed to the outer surface of short lens tube 7 and extend radially through the therewith associated linear slots 8 and 9 and helical slot 22.

The forward end of fixed tube 1 supports the forward lens tube 27 within which forward fixed lens component $G_1$ is housed. Lens tube 27 is internally threaded, as indicated at 26, so that such front lens tube is longitudinally adjustable on the exteriorly threaded forward portion of fixed tube 1 for focussing purposes.

The structure of FIGS. 3 and 4 is attached to the objective 0 of the photographic or projection equipment (FIG. 1) by any appropriate prior known method, that is, the end cover 14 or the reduced portion 15 may be tightened to the lens barrel of objective 0 or the outer tube 12 may be rigidly attached to the camera with a predetermined distance or spacing between rear component $G_5$ and objective 0. As shown in FIG. 3, the system is at unit magnification as shown diagrammatically at line (B) of FIG. 2. After affixing the structure to the camera, shaft 20 is rotated counterclockwise in FIG. 4 to advance inner lens tube 4, i.e. move it to the left in FIG. 3. The extreme position in this direction is shown in line (A) and in such position, at which maximum magnification obtains, focussing the system is very simple. Counterclockwise rotation of shaft 20 produces clockwise rotation of rotatable lens tube 10 by way of pinion 21 and gear 17. Guide pin 24 is guided by helical slot 23 and inner lens tube 4 slides along linear slot 8. Simultaneously, clockwise rotation of helical slot 22 moves pin 25, that is, short lens tube 7, in the other direction to the rear along linear slots 8 and 9. When the optical components have reached their positions as above stated, front lens tube 27 is rotated in either direction to obtain a sharp focus when viewing the image through the entire optical array, for example, in the case of reflex cameras. Front lens tube 24 is provided with a distance scale, and a fixed reference mark is provided on fixed lens tube 1 for focussing the optical system with cameras of other than the reflex type. When focussing is completed, shaft 20 is rotated clockwise and the optical elements positioned as desired between the limits shown in lines (A) and (C) of FIG. 2.

Figure 5:
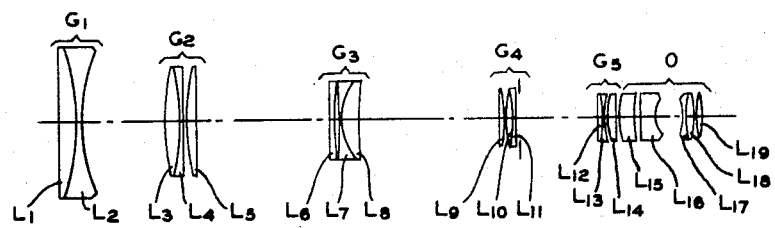
FIG. 5 is a longitudinal section in the vertical plane through the optical axis of another illustrative embodiment of my invention.

The numerical detailed data of another modified embodiment of the instant invention together with its cooperating objective 0 shown in FIG. 5 is as follows; components $G_1$, $G_2$ . . . $G_5$ of this embodiment having opposite signs of refractive powers of the respective like components as compared to the embodiments of FIGS. 1 through 4:

| Component | Lens | Radius of Curvature | Lens Thickness or Air Space | Refractive Index | Abbe Number |
|---|---|---|---|---|---|
| $G_1$ | $L_1$ | $r_1 = -1,000.0$ | $d_1 = 14.0$ | $N_1 = 1.6645$ | $V_1 = 35.9$ |
|  |  | $r_2 = -181.6$ |  |  |  |
|  | $L_2$ |  | $d_2 = 4.0$ | $N_2 = 1.6228$ | $V_2 = 56.9$ |
|  |  | $r_3 = 205.7$ |  |  |  |
|  |  |  | $s_1 =$ variable |  |  |
| $G_2$ | $L_3$ | $r_4 = 405.0$ | $d_3 = 16.0$ | $N_3 = 1.6204$ | $V_3 = 60.3$ |
|  |  | $r_5 = -148.24$ |  |  |  |
|  | $L_4$ |  | $d_4 = 3.0$ | $N_4 = 1.6889$ | $V_4 = 31.1$ |
|  |  | $r_6 = -1,000.0$ |  |  |  |
|  |  |  | $s_2 = 0.1$ |  |  |
|  | $L_5$ | $r_7 = 207.3$ | $d_5 = 12.0$ | $N_5 = 1.6204$ | $V_5 = 60.3$ |
|  |  | $r_8 = -683.6$ |  |  |  |
|  |  |  | $s_3 =$ variable |  |  |
| $G_3$ | $L_6$ | $r_9 = -1,000.0$ | $d_6 = 2.5$ | $N_6 = 1.6172$ | $V_6 = 54.0$ |
|  |  | $r_{10} = 191.56$ |  |  |  |
|  |  |  | $s_4 = 5.0$ |  |  |
|  | $L_7$ | $r_{11} = -250.0$ | $d_7 = 2.5$ | $N_7 = 1.6127$ | $V_7 = 58.6$ |
|  |  | $r_{12} = 44.8$ |  |  |  |
|  | $L_8$ |  | $d_8 = 12.5$ | $N_8 = 1.6129$ | $V_8 = 37.0$ |
|  |  | $r_{13} = 331.4$ |  |  |  |
|  |  |  | $s_5 =$ variable |  |  |

| Component | Lens | Radius of Curvature | Lens Thickness or Air Space | Refractive Index | Abbe Number |
|---|---|---|---|---|---|
| $G_4$ | $L_9$ | $r_{14}=\infty$ | $d_9=3.5$ | $N_9=1.6204$ | $V_9=60.3$ |
| | | $r_{15}=-229.4$ | $s_6=0.1$ | | |
| | $L_{10}$ | $r_{16}=203.0$ | $d_{10}=7.5$ | $N_{10}=1.6204$ | $V_{10}=60.3$ |
| | | $r_{17}=-92.227$ | | | |
| | $L_{11}$ | | $d_{11}=2.4$ | $N_{11}=1.6398$ | $V_{11}=34.6$ |
| | | $r_{18}=\infty$ | $s_7=$variable | | |
| $G_5$ | $L_{12}$ | $r_{19}=-778.9$ | $d_{12}=3.2$ | $N_{12}=1.6398$ | $V_{12}=34.6$ |
| | $L_{13}$ | $r_{20}=-105.0$ | $d_{13}=1.6$ | $N_{13}=1.6385$ | $V_{13}=55.5$ |
| | | $r_{21}=239.45$ | $s_8=2.0$ | | |
| Objective O | $L_{14}$ | $r_{22}=86.70$ | $d_{14}=8.4$ | $N_{14}=1.62084$ | $V_{14}=60.3$ |
| | | $r_{23}=435.0$ | $s_9=0.3$ | | |
| | $L_{15}$ | $r_{24}=55.286$ | $d_{15}=17.25$ | $N_{15}=1.56377$ | $V_{15}=60.9$ |
| | | $r_{25}=111.075$ | $s_{10}=2.4$ | | |
| | $L_{16}$ | $r_{26}=214.5$ | $d_{16}=17.85$ | $N_{16}=1.67266$ | $V_{16}=32.0$ |
| | | $r_{27}=34.68$ | $s_{11}=26.25$ | | |
| | $L_{17}$ | $r_{28}=-47.3$ | $d_{17}=0.9$ | $N_{17}=1.57808$ | $V_{17}=41.6$ |
| | $L_{18}$ | $r_{29}=55.5$ | $d_{18}=11.55$ | $N_{18}=1.63867$ | $V_{18}=55.3$ |
| | | $r_{30}=-55.5$ | $s_{12}=0.3$ | | |
| | $L_{19}$ | $r_{31}=109.5$ | $d_{19}=4.5$ | $N_{19}=1.61193$ | $V_{19}=37.1$ |
| | | $r_{32}=-493.5$ | | | | where $G_{subscript}$ is the component number, $L_{subscript}$ the lens element number, $r_{subcript}$ the radius of curvature of the lens element, $d_{subscript}$ the lens thickness at the optical axis, $s_{subscript}$ the air space or distance along the optical axis between successive surfaces of the lens elements, $N_{subscript}$ the index of refraction and $V_{subscript}$ the Abbe number of the glass of the lens elements, the subscripts progressing from the object to the image side of the optical system, and where the values of the air spaces above marked "variable" are as in the below table for the focal lengths F of the whole system; and

| F | 60.0 | 150.0 | 400.0 |
|---|---|---|---|
| $s_1$ | 104.12 | 60.85 | 14.66 |
| $s_3$ | 5.96 | 104.55 | 210.62 |
| $s_5$ | 207.06 | 108.47 | 2.40 |
| $s_7$ | 20.98 | 64.25 | 110.44 |

Designating the focal lengths of components $G_1$ to $G_6$ by $f_1$ to $f_6$ respectively, their numerical values are as follows, corresponding to the abovementioned examples:

| $f_1=-287.2$ | $f_2=180.0$ | $f_3=-120.0$ |
|---|---|---|
| $f_4=180.0$ | $f_5=-287.2$ | $f_6=150.0$ | and values of $t$, $s$, $m_2$, $m_3$ and $m_4$ in the abovementioned Formulae 1 and 4 are respectively as follows corresponding to three specific values of the focal length F in the whole system.

| F | 60.0 | 150.0 | 400.0 |
|---|---|---|---|
| $t$ | +43.279 | 0 | −46.189 |
| $s$ | −55.311 | 0 | +59.877 |
| $m_2$ | −0.806 | −1 | −1.257 |
| $m_3$ | −0.653 | −1 | −1.578 |
| $m_4$ | −0.760 | −1 | −1.345 |

In the abovementioned examples, the optical system $L_1$ to $L_{13}$ forms an afocal zoom part in this zoom lens system. Consequently, if this zoom part is optionally extended or shortened to some extent, it gives no substantial variation in the aberration correction of the whole optical system, and in the optical system $L_1$ to $L_{13}$, if the individual surface curvature $$\left(\frac{1}{r}\right)$$

differs by 0.001 each and if the refractive index $Nd$ and the Abbe number V by 5% each, it gives no substantial variation in the aberration correction. Moreover, if the values of $d$ and $s$, except for $s_1$, $s_3$, $s_5$ and $s_7$, are optionally differed to an extent that brings no mechanical interference in the system, it gives no substantial difference in the aberration correction.

Designating the total amount of movement of the three movable components by $T_2$ for component $G_2$, $T_3$ for component $G_3$ and $T_4$ for $G_4$, distance between the outer movable component $G_2$ and $G_4$ by $d_{24}$, the most preferred form of my invention is obtained when observing the following conditions:

$$f_2>0, f_3<0, f_4>0$$
$$1.2|f_3|<\tfrac{1}{2}(f_2+f_4)<1.8|f_3|$$
$$0.6T_3<\tfrac{1}{2}(T_2+T_4)<0.9T_3$$

and $$0.8|f_3|<d_{24}<3.2|f_3|$$

The last formula, relating to $d_{24}$, should be observed at each stage of the movement.

The conditions assure, firstly the adequate symmetry of the movable part structure necessary for uniform correction of the abberations over the varifocal range, and, secondly, the large contribution of the inner movable component $G_3$ to the variation in magnification which cooperates with components $G_2$ and $G_4$ for extending the varifocal range. Furthermore, in the construction of the practical embodiment, careful attention should be paid to the precise form of components $G_2$ and $G_3$, since the full aperture ray incident together with the field ray upon these lenses are at a very high aperture ratio. In this connection, the preferable construction of components $G_2$ and $G_3$ is that in which:

Component $G_2$ consists of a front positive member and a rear positive member separated by an air space, the front positive member in turn consisting of a positive and a negative lens cemented together and the rear positive member has a front convex surface of which the radius of curvature is larger that $f_2/2$ but smaller than $3f_2$, the radius of curvature of the rear surface thereof being numerically larger than $2f_2$, and this lens should be as thin as possible, desirably a single lens.

Component $G_3$ consists of a front negative member and a rear negative member separated by an air space, the front negative member has a front surface of a radius of curvature numerically larger than $2|f_3|$, and a rear concave surface of a radius of curvature larger than $0.7|f_3|$ but smaller than $3|f_3|$, and this lens should be as thin as possible, desirably a single lens, while the rear negative member consists of a negative and a positive lens cemented together.

By observing the conditions that, firstly, the respective parts of components $G_2$ and $G_3$, occupying positions between the backward nodal plane of $G_2$ and the forward nodal plane of $G_3$, are made very thin so that unfavorable reduction in the varifocal range due to lens thickness is not so severe even at the closely spaced limit of $G_2$ and $G_3$, and so even when achromatic construction of $G_2$ and $G_3$ necessitates relatively considerable lens thickness; secondly, spherical abberation, coma and field curvature are corrected at the two points in the neighborhood of both ends of the varifocal range; and, thirdly, barrel-shaped distortion at the smallest magnification is greatly reduced without increasing the other aberrations.

Figure 6:
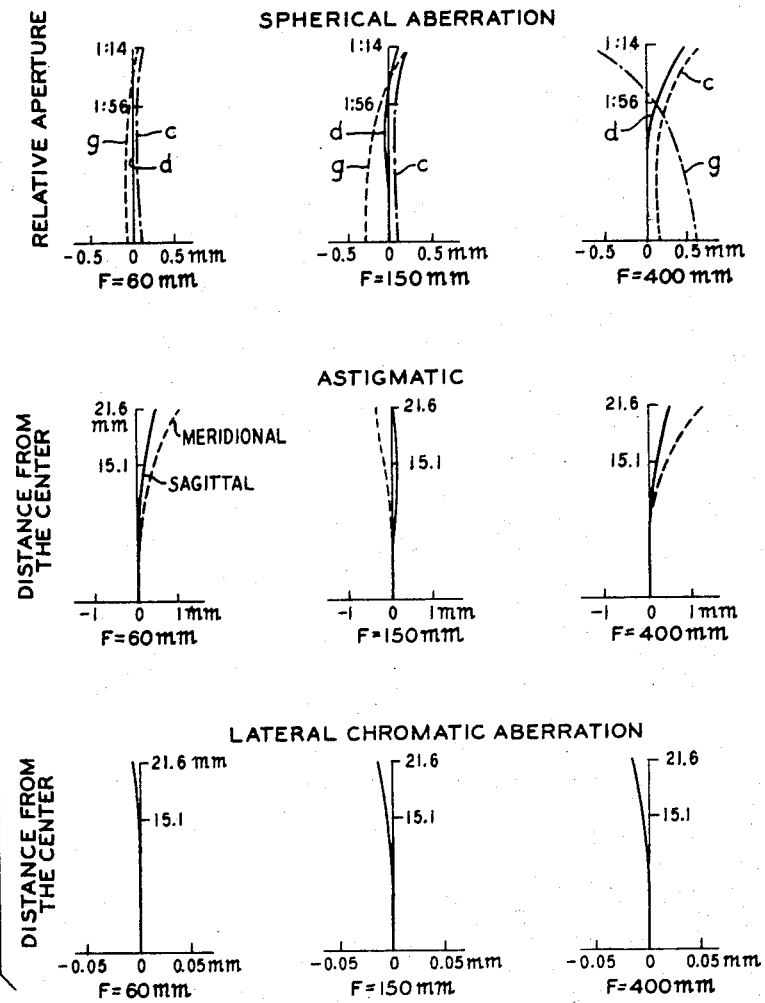
FIG. 6 depicts the aberration graphs of the lenses utilized in the embodiment of FIG. 5.

The aberration curves of FIG. 6 show how effective these conditions are for reducing the various aberrations, and the image quality of this varifocal lens system at any of the varifocal positions is just as good, at least, as that of single purpose lenses.

As is well known, in lens systems generally, for a magnification equal to minus one, the distance between an object and its image becomes a stationary value as the components of the lens system are displaced or the magnification is varied. That is to say, near the position of the magnification equal to minus one, even for a considerable variation of the magnification, the requirement for constancy of the image position is easily met. As described above, the varifocal lens system of the present invention is so constructed that each of the three movable components simultaneously operates at a magnification substantially equal to minus unity at one position of their movement. Therefore, the requirement for constancy of the image position is shared by the respective movable lens components; that is, the expected error in the arrangement of the movable components has almost no effect upon the location of the final image plane when varying the magnification. Thus, there is no special need of reducing the varifocal range in order to maintain constancy of the final image position. Each movable component has an individual magnification equal to minus one at the near center of its movement, and the advantage of this effect is clarified by a formula as follows:

$$e = \delta (1 - m^2) M^2$$

where $e$ indicates the variation on the location of the final image plane, $\delta$ is the error expected in the arrangement of movable components generally having their individual magnifications $m$, and $M$ indicates the magnifying power of the lens system behind these movable components. According to this formula, the displacement of the final image plane in the system of the present application is to be zero ($e=0$) at the near center of movement where the magnification of each movable component is equal to minus one ($m=-1$). Consequently in this invention, the error due to the lens arrangement (or to the cam mechanism) disappears at both ends and the near center of movement when lenses are so carefully arranged as not to give the error (i.e. it should be $\delta=0$) at both ends of their movement, so that errors in the midway between the center and the ends of movement should be very little. Further, since the outer two of the movable components are moved in opposite direction to the inner one, component $G_3$, the respective magnifications of the three components can be increased or decreased simultaneously and the range of the magnification of the whole system is wide for the relatively small movement of each component. Therefore, with a small amount of movement, a very large varifocal range is obtained. Each movable lens gives the very strong effect to variable magnification as follows. In U.S. Patent 2,782,684 (by H. H. Hopkins, 1957), the numerical values of focal length in each component are given as $f_1=-9$, $f_2=+5$, $f_3=-2$, $f_4=+5$, $f_5=-9$, and in this case the zoom lens system in which the zoom ratio R is about 50 ($R \approx 50$) and the whole length of the system is indicated by $L \approx 16$. On the other hand, when the value of focal length is not changed from abovementioned Hopkins's examples but the arrangement and movable condition of each component is to be the form of present application, the zoom ratio is developed as $R \approx 83$, being made 1.6 times that of Hopkins' system and its whole length would be nearly the same as Hopkins, $L \approx 17$. Furthermore, in spite of the large varifocal range, not only is the total length of the whole system rather small but also a sufficient amount of light flux strikes the peripheral portion of the image area for the rather small front diameter of the system. As the amount of movement of the movable lens components is small, the increase of the aberrations due to the changed spatial position of the component will be small. In particular, the largest movement is made by the lens component of the smallest refractive power. Therefore, the aberrations are well corrected over the entire range of variable magnification. These are the various features of the present invention and are very effective as a varifocal lens system.

In all three of the above described varifocal systems, the second and fourth components are moved in unison, and to do so in an optical system is prior known. However, the conspicuous feature of the varifocal lens system according to the present invention as compared with any conventional varifocal lens system is as follows:

In conventional varifocal lens systems, the mechanically coupled components $G_2$ and $G_4$ moving as a unit, share the greater part of the varifocal action, the role of the intermediate lens component $G_3$ is chiefly to keep the final image position constant and its contribution to the varifocal action is rather of secondary significance.

On the contrary, in the varifocal lens system according to the present invention, in the first place, the lens components $G_2$ and $G_4$, moving as a unit on each side of $G_3$, simultaneously pass through the positions in which each of them works at a magnification of $-1$ to maintain the final image at a fixed position, and in the second place, the intermediate lens component $G_3$ moves in the opposite direction to that of the lens components $G_2$ and $G_4$ moving in unison positively to change the magnification of the optical system.

This share of the optical action is readily seen from Example 1, wherein the varifocal ratio $R=9$, is shared by each of components $G_2$ and $G_4$, $R_2=R_4=2$, and the remaining 2.25 is produced by component $G_3$, $R_3=2.25$; and in Example 2, the share of component $G_3$ is still larger, its share of the varifocal ratio being $R_3=2.8$ as against 1.8 for each of components $G_2$ and $G_4$, $R_2=R_4=1.8$.

These two points are the remarkable features of the varifocal lens system according to the present invention. As a result, it can numerically be proved that even if the powers of the three movable components $G_2$, $G_3$ and $G_4$ be identical, and even if the total length of the whole system be nearly equal, the varifocal lens system according to the present invention will give a far greater varifocal range than any prior varifocal lens system.

What I claim is:

1. A varifocal lens system having a movable and a fixed portion arranged on a common optical axis, the movable portion comprising three axially spaced lens components, each of the outer two components of the movable portion having a refractive power of the same sign and equal to the other in magnitude, each of the outer components of the movable portion also being movable an amount directly proportional to the amount the inner component of the movable portion is moved at all stages of component movement, the inner component having a refractive power of sign opposite to that of each outer component, the fixed portion comprises two lens components of which one is in front of and the other is to the rear of the movable portion, the focal length of the fixed front lens component being equal to that of the fixed rear lens component, the fixed front lens component having a refractive power of the same sign as the inner movable component, mechanical means coupling the outer movable components to each other at a fixed distance from each other, the focal lengths $f_2$, $f_3$ and $f_4$ of, respectively, the front outer movable, the inner movable and the rear outer movable components meeting the conditions that:

$$f_2 > 0;\ f_3 < 0;\ f_4 > 0;\ f_2 = f_4$$
$$[4(f_2+f_3)^2 - f_2(f_2+2f_3)]T^2 + 4f_2^2(f_2+f_3)T - 4(f_2+f_3)^2 f_2^2 = 0$$
$$M = m_2 m_3 m_4$$
$$m_2 = \frac{-f_2}{f_2 + T}$$
$$m_3 = \frac{\frac{f_2 T}{f_2 - T} - f_3 - 2(f_2 + f_3)}{f_3}$$
$$m_4 = \frac{T - f_2}{f_2}$$

where $2T$ is the total movable distance of the outer movable components, $M^2$ is the zoom ratio of the system, $m_2$, $m_3$ and $m_4$ are the respective magnification powers of the front outer movable component, the inner movable component and the rear outer movable component when all the movable lens components are sufficiently thin, $$1.2|f_3| < \tfrac{1}{2}(T_2 + T_4) < 1.8|f_3|$$

and $$0.6\ T_3 < \tfrac{1}{2}(T_2 + T_4) < 0.9\ T_3$$

where $T_{\text{subscript}}$ is the distance through which the front and rear movable component, respectively, is movable, means for moving the movable portion in such manner that both outer movable components move axially in the same direction while the inner movable component moves axially in the opposite direction to produce the image of a spatially fixed object at a spatially fixed position while the magnification of the whole system is continuously varied by such movement of the movable components and the individual magnifications of the three movable components simultaneously and uniformly increase and decrease and at one position of its such movement each of the three movable components functions simultaneously with the other two movable components at a magnification substantially equal to $-1$, the distance $d_{24}$ between the outer movable components is defined by $$0.8|f_3| < d_{24} < 3.2|f_3|$$

during their movement, the relation between the displacement $t$ of the outer movable components and the displacement $s$ of the inner movable component is $$(f_2^2 - t^2)s^2 + 2t^3 s - t^2(t^2 - 2f_2 f_3) = 0$$

where $t$ and $s$ are the displacements measured from the location at which both the outer and the inner movable components produce a magnification of minus 1, the focal length $f_1$ of the fixed front lens component is nearly equal to that of the rear fixed component and satisfies the relation $$f_1 = (T - 2f_2)k$$

where $k$ is a factor representing the lens thickness and is of a value less than 1 but greater than 0, and the front outer movable component comprises a front positive member and a rear positive member separated by an air space, the front positive member consists of a positive and a negative lens cemented together, and the rear positive member is a single lens of which the front convex surface has a radius of curvature larger than $f_2/2$ but smaller than $3f_2$ and the rear surface has a radius of curvature numerically larger than $2f_2$.

2. A varifocal lens system according to claim 1 wherein the inner movable component comprises a front negative member and a rear negative member separated by an air space, the front negative member is a single lens of which the radius of curvature of the front surface is numerically larger than $2f_3$ and the radius of curvature of its rear concave surface is larger than $0.7f_3$ but smaller than $3f_3$, and the rear negative member consists of a negative and a positive lens cemented together.

3. A varifocal lens system according to claim 1 of which the detailed data is as follows:

| Component | Lens | Radius of Curvature | Lens Thickness or Air Space | Refractive Index | Abbe Number |
|---|---|---|---|---|---|
| $G_1$ | $L_1$ | $r_1 = -1,000.0$ | $d_1 = 14.0$ | $N_1 = 1.6645$ | $V_1 = 35.9$ |
|  |  | $r_2 = -181.6$ |  |  |  |
|  | $L_2$ |  | $d_2 = 4.0$ | $N_2 = 1.6228$ | $V_2 = 56.9$ |
|  |  | $r_3 = 205.7$ |  |  |  |
|  |  |  | $s_1 = $ variable |  |  |
| $G_2$ | $L_3$ | $r_4 = 405.0$ | $d_3 = 16.0$ | $N_3 = 1.6204$ | $V_3 = 60.3$ |
|  |  | $r_5 = -148.24$ |  |  |  |
|  | $L_4$ |  | $d_4 = 3.0$ | $N_4 = 1.6889$ | $V_4 = 31.1$ |
|  |  | $r_6 = -1,000.0$ |  |  |  |
|  |  |  | $s_2 = 0.1$ |  |  |
|  | $L_5$ | $r_7 = 207.3$ | $d_5 = 12.0$ | $N_5 = 1.6204$ | $V_5 = 60.3$ |
|  |  | $r_8 = -683.6$ |  |  |  |
|  |  |  | $s_3 = $ variable |  |  |
| $G_3$ | $L_6$ | $r_9 = -1,000.0$ | $d_6 = 2.5$ | $N_6 = 1.6172$ | $V_6 - 54.0$ |
|  |  | $r_{10} = 191.56$ |  |  |  |
|  |  |  | $s_4 = 5.0$ |  |  |
|  | $L_7$ | $r_{11} = -250.0$ | $d_7 = 2.5$ | $N_7 = 1.6127$ | $V_7 = 58.6$ |
|  |  | $r_{12} = 44.8$ |  |  |  |
|  | $L_8$ |  | $d_8 = 12.5$ | $N_8 = 1.6128$ | $V_8 = 37.0$ |
|  |  | $r_{13} = 331.4$ |  |  |  |
|  |  |  | $s_5 = $ variable |  |  |
| $G_4$ | $L_9$ | $r_{14} = \infty$ | $d_9 = 3.5$ | $N_9 = 1.6204$ | $V_9 = 60.3$ |
|  |  | $r_{15} = -229.4$ |  |  |  |
|  |  |  | $s_6 = 0.1$ |  |  |
|  | $L_{10}$ | $r_{16} = 203.0$ | $d_{10} = 7.5$ | $N_{10} = 1.6204$ | $V_{10} = 60.3$ |
|  |  | $r_{17} = -92.227$ |  |  |  |
|  | $L_{11}$ |  | $d_{11} = 2.4$ | $N_{11} = 1.6398$ | $V_{11} = 34.6$ |
|  |  | $r_{18} = \infty$ |  |  |  |
|  |  |  | $s_7 = $ variable |  |  |
| $G_5$ | $L_{12}$ | $r_{19} = -778.9$ | $d_{12} = 3.2$ | $N_{12} = 1.6398$ | $V_{12} = 34.6$ |
|  |  | $r_{20} = -105.0$ |  |  |  |
|  | $L_{13}$ |  | $d_{13} = 1.6$ | $N_{13} = 1.6385$ | $V_{13} = 55.5$ |
|  |  | $r_{21} = 239.45$ |  |  |  | where $G_{subscript}$ is the component, $L_{subscript}$ the lens element, $r_{subscript}$ the radius of curvature of the lens element, $d_{subscript}$ the lens thickness at the optical axis, $s_{subscript}$ the air space or distance along the optical axis between successive surfaces of the lens elements, $N_{subscript}$ the index of refraction and $V_{subscript}$ the Abbe number of the glass of the lens elements, the subscripts progressing from the object to the image side of the optical system, and where the numerical values of the air spaces above given as "variable" are, for focal lengths F of the whole system:

| F | 60.0 | 150.0 | 400.0 |
|---|---|---|---|
| $s_1$ | 104.12 | 60.85 | 14.66 |
| $s_3$ | 5.96 | 104.55 | 210.62 |
| $s_5$ | 207.06 | 108.47 | 2.40 |
| $s_7$ | 20.98 | 64.25 | 110.44 | the individual surface curvatures $1/r_{subscript}$ being variable by a maximum of $\pm 0.001$, the refractive indices $N_{subscript}$ and the Abbe numbers $V_{subscript}$ being variable by a maximum of $\pm 5\%$, and the values of the thicknesses $d_{subscript}$ and of the spacings $s_{subscirpt}$ being variable in such amount as not to cause substantial mechanical interference within the system.

References Cited by the Examiner
UNITED STATES PATENTS 2,741,155  4/56  Hopkins _____ 88—57
2,782,684  2/57  Hopkins _____ 88—57

JEWELL H. PEDERSEN, *Primary Examiner.*
EMIL G. ANDERSON, *Examiner.*